INTERIOR SHUTTER TYPE BLIND CONSTRUCTION

Filed April 10, 1968 5 Sheets-Sheet 1

INVENTORS
KENNETH S. SHELLMAN, SR.
OLLIE M. SHELLMAN
BY
Melvin A. Crosby

INTERIOR SHUTTER TYPE BLIND CONSTRUCTION

Filed April 10, 1968 5 Sheets-Sheet 2

INVENTORS
KENNETH S. SHELLMAN, SR.
OLLIE M. SHELLMAN
BY
Melvin A. Crosby

INVENTORS
KENNETH S. SHELLMAN, SR.
OLLIE M. SHELLMAN
BY

Melvin A. Crosby

INTERIOR SHUTTER TYPE BLIND CONSTRUCTION

Filed April 10, 1968 5 Sheets-Sheet 4

INVENTORS
KENNETH S. SHELLMAN, SR.
OLLIE M. SHELLMAN
BY

Melvin A. Crosby

INTERIOR SHUTTER TYPE BLIND CONSTRUCTION

INVENTORS
KENNETH S. SHELLMAN, SR.
OLLIE M. SHELLMAN
BY
Melvin A. Crosby

United States Patent Office 3,496,675
Patented Feb. 24, 1970

3,496,675

INTERIOR SHUTTER TYPE BLIND CONSTRUCTION

Kenneth S. Shellman, Sr., and Ollie M. Shellman, both of 55 Kesling Drive, Springboro, Ohio 45066

Filed Apr. 10, 1968, Ser. No. 720,303
Int. Cl. E06b 9/26
U.S. Cl. 49—63 8 Claims

ABSTRACT OF THE DISCLOSURE

Shutter type blind construction for mounting in a window opening inside a window and consisting of a frame having a plurality of panels therein which are apertured and the apertures of which register in one relative position of the panels while the panels can be moved relatively to vary the degree of registration of the apertures or to bring the apertures out of registration so that there is little or no direct passage for light through the blind construction.

The present invention relates to a shutter type blind construction and is particularly concerned with a blind construction of the nature referred to especially adapted for mounting in a window or door opening on the inside thereof.

The arrangement of the present invention is particularly well adapted for use in summer type homes and the like wherein it is desired to eliminate, as much as possible, fabric type drapes and curtains and the like over the windows. It will be appreciated, however, as the description proceeds, that the shutter type blind construction of the present invention is also usable in other circumstances and has, in fact, general application for the purpose of mounting in window openings to control the amount of light coming therethrough and also to provide opaque closures for the window openings.

A particular object of the present invention is the provision of a compact shutter type blind construction for a window opening which is convenient to mount in a window opening and which is convenient to adjust.

A further object of the present invention is the provision of a shutter type blind construction of the nature referred to which is relatively compact and inexpensive.

A still further object of the present invention is the provision of a shutter type blind of the nature referred to which is capable of many design variations in order to modify the appearance thereof.

A still further object is the provision of a shutter type blind construction which requires very little maintenance and which can easily be cleaned and which does not deteriorate so that it has long life.

The foregoing objects of the present invention as well as still other objects and advantages thereof will become more apparent upon reference to the following detailed specification taken in connection with the accompanying drawings in which.

Figures 4, 5, 6, 7, 7A, 8:
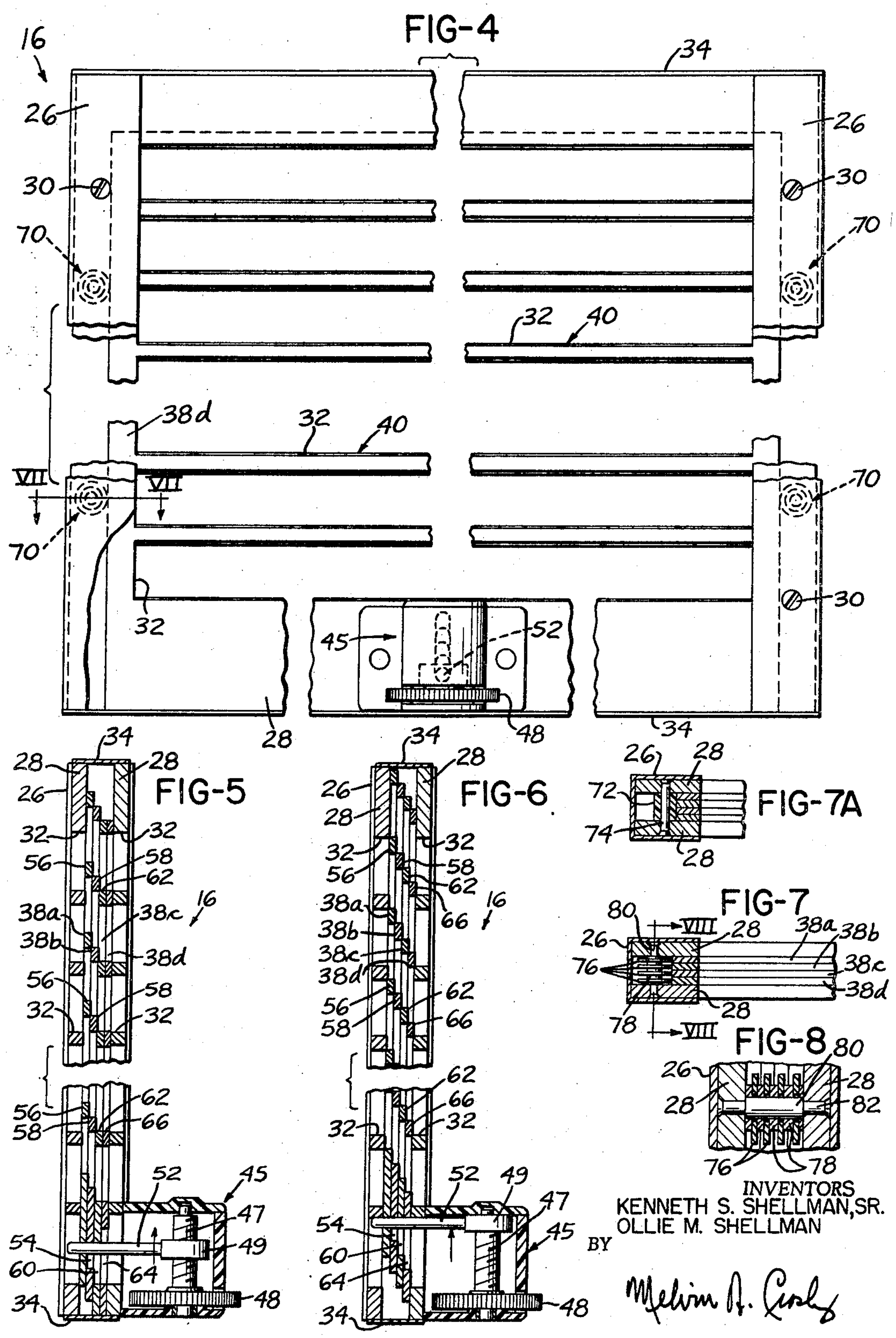
FIGURE 4 is a view looking in from the right side of FIGURE 2 and showing the blind in fully opened position.
FIGURE 5 is a vertical sectional view like FIGURE 2 but showing only the blind and illustrating the blind in partially closed position.
FIGURE 6 is a view like FIGURE 5 but shows the blind in fully closed position.

FIGURES 7 and 7*a* are plan sectional views taken at the plane indicated by line VII—VII on FIGURE 4 and showing different guide arrangements for guiding the movable panels of the blind during movement thereof.

FIGURE 8 is a sectional view indicated by line VIII—VIII on FIGURE 7 and drawn at somewhat enlarged scale showing more in detail the guide roller arrangement of FIGURE 7.

Figures 9, 10:
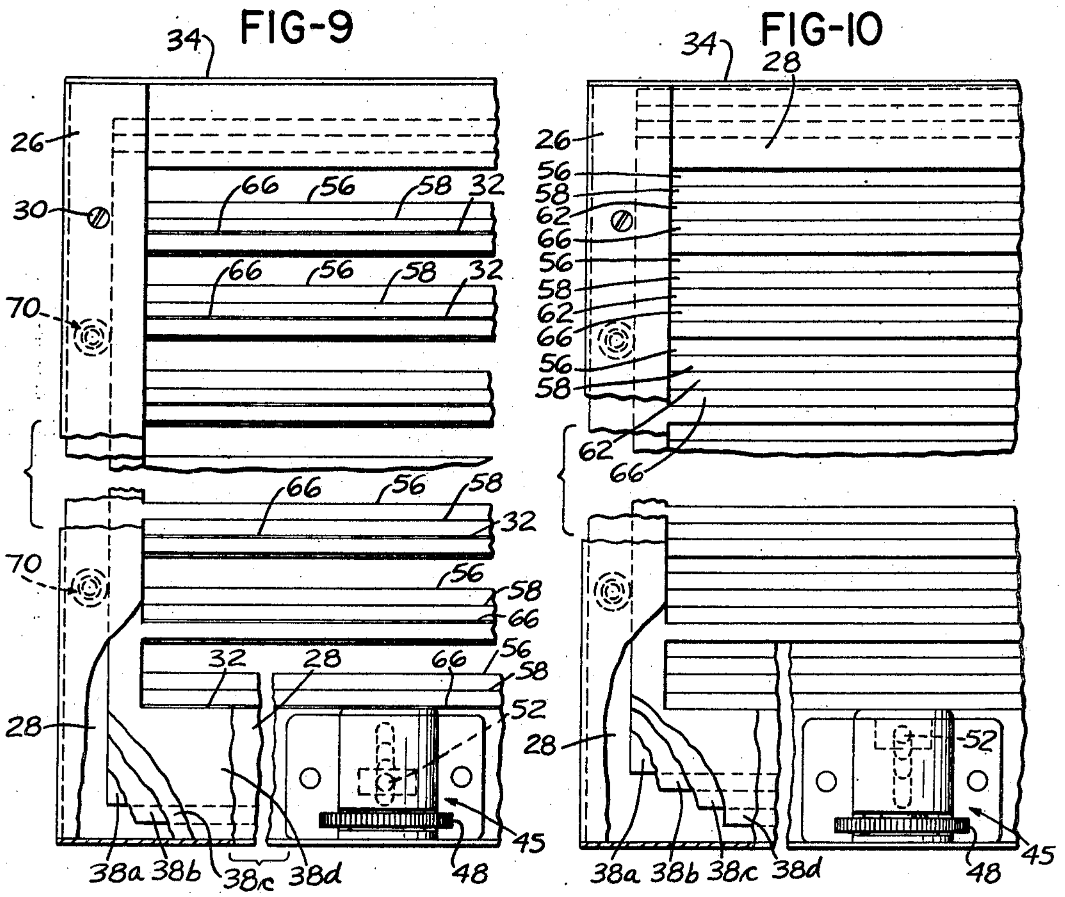

FIGURE 9 is an elevational view similar to FIGURE 4, except shown fragmentarily, and illustrating the blind partly closed as in FIGURE 5.

FIGURE 10 is a view similar to FIGURE 9 but shows the blind in its fully closed position of FIGURE 6.

Figure 11:
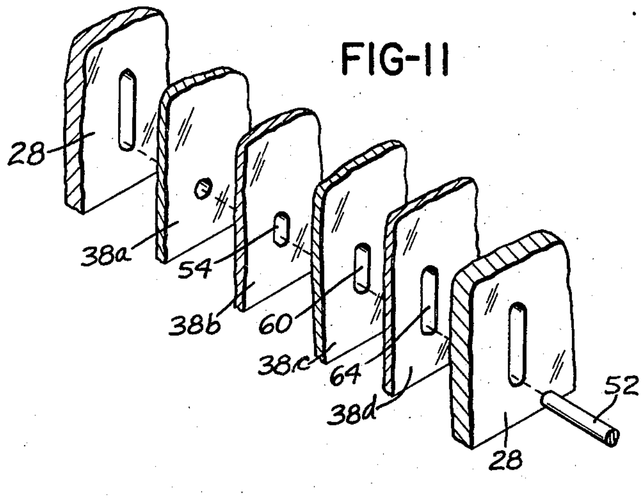

FIGURE 11 is an exploded perspective view showing the arrangement of the enclosing frame of the blind and the movable panels mounted therein and the apertures in the panel that receive the drive pin of the actuator.

Figure 12:
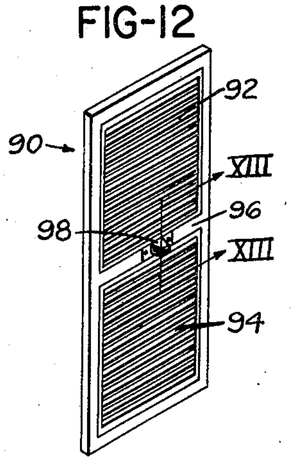

FIGURE 12 is a perspective view showing how a blind of the present invention could be made for longer windows, such as windows reaching closer to the floor, and for doors, and having actuator means for the blind in about the center thereof.

Figures 13, 14, 15, 16, 17, 18:
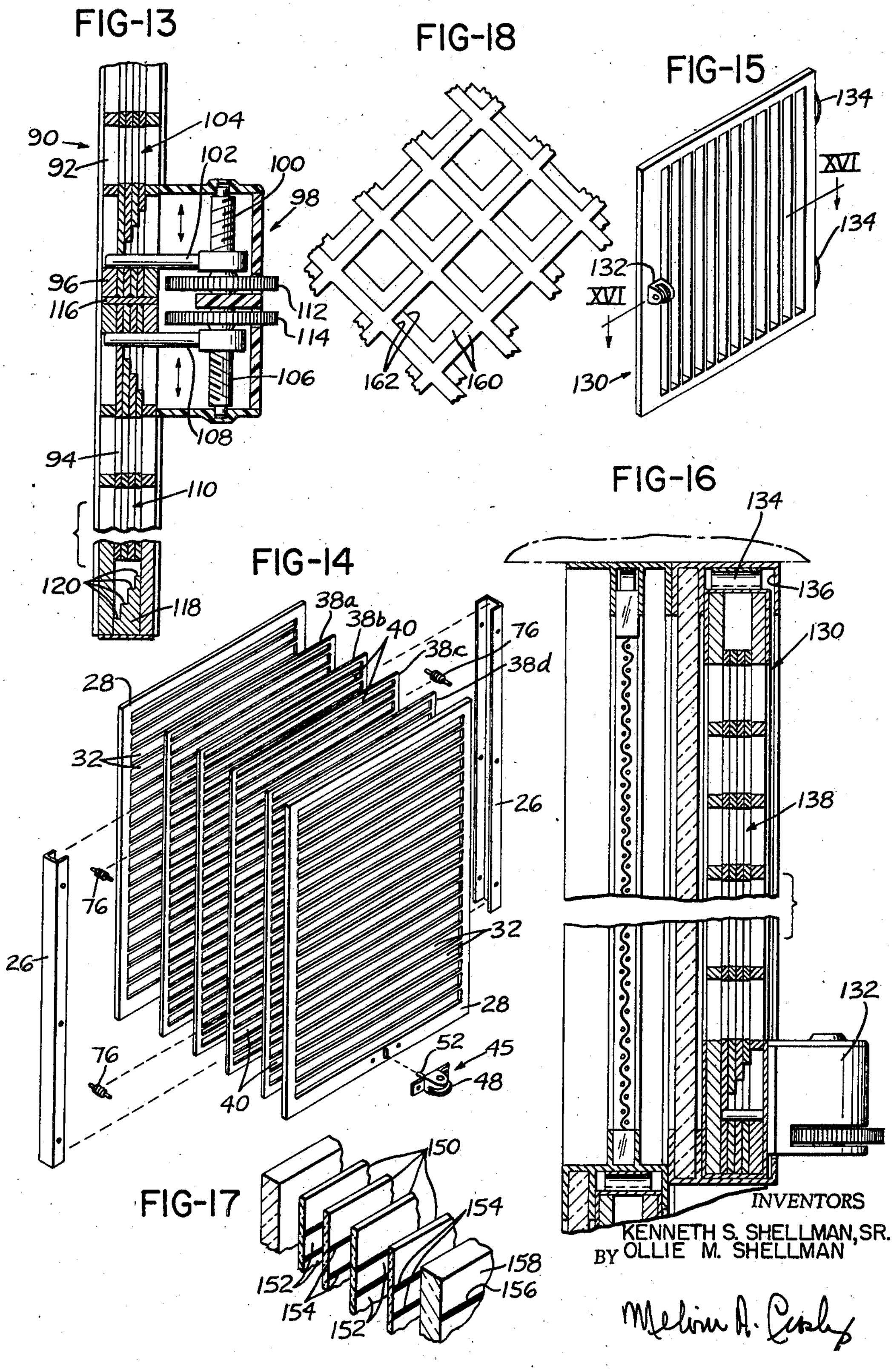

FIGURE 13 is a sectional view drawn in enlarged scale and indicated by line XIII—XIII on FIGURE 12.

FIGURE 14 is an exploded view showing a typical shutter type blind panel according to the present invention.

FIGURE 15 is a perspective view showing how a shutter type blind panel of the present invention could be arranged so that the movable panel portions thereof moved in the horizontal direction during adjustment.

FIGURE 16 is a sectional view indicated by line XVI—XVI on FIGURE 15.

FIGURE 17 is a perspective view showing how the major panels of the blind according to the present invention could be formed of glass with alternate transparent and opaque regions.

FIGURE 18 is a fragmentary view showing how the panels could be formed with different type openings therein.

Figures 19, 20, 21, 22:
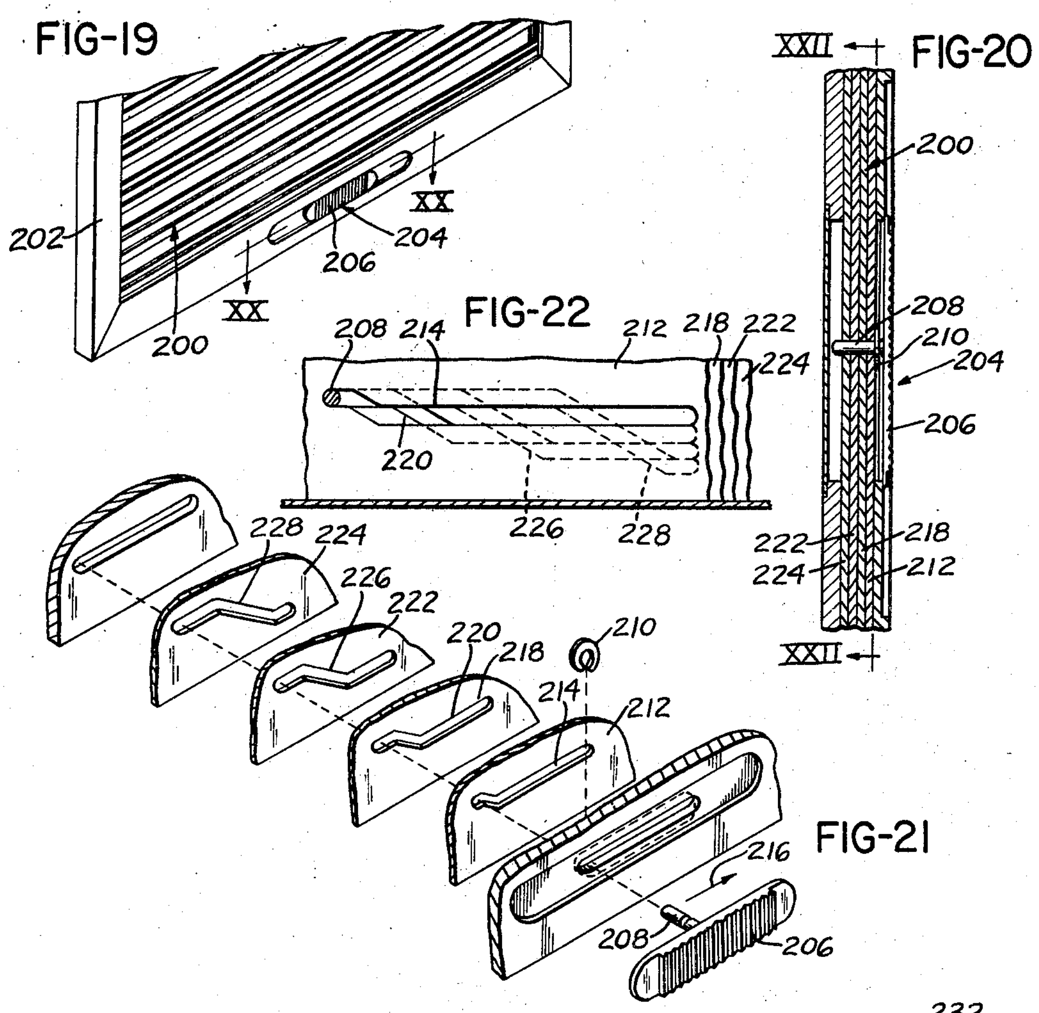

FIGURE 19 is a perspective view of a modification having a different type of actuator for the panels.

FIGURE 20 is a plan sectional view indicated by line XX—XX on FIGURE 19.

FIGURE 21 is an exploded perspective view of the actuator arrangement of FIGURES 19 and 20.

FIGURE 22 is a somewhat schematic view looking in at the movable panels from the actuator side showing the relationship of the slots in the panels forming a part of the actuator arrangement.

Figure 23:
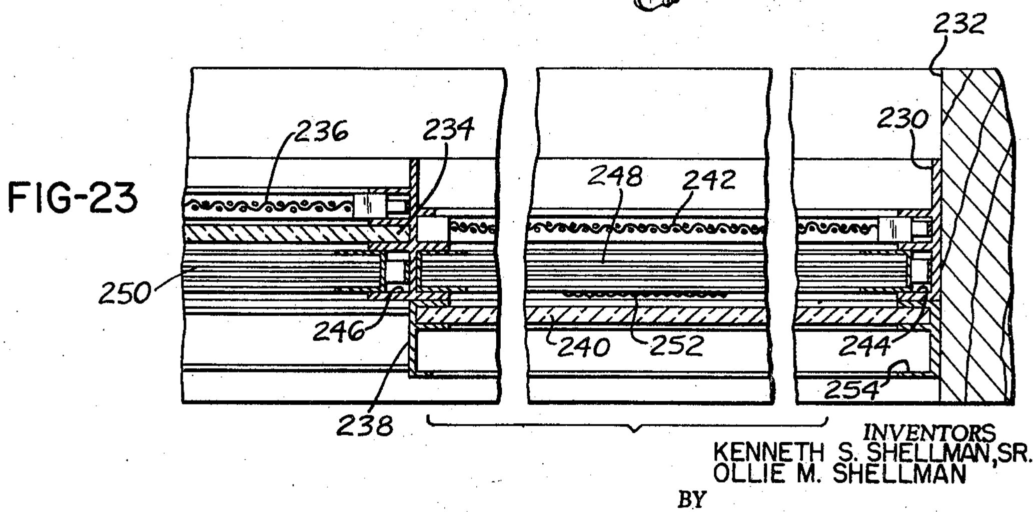

FIGURE 23 is a somewhat schematic plan sectional view of a casement window showing how the present invention is adapted for incorporation therein.

Figure 24:
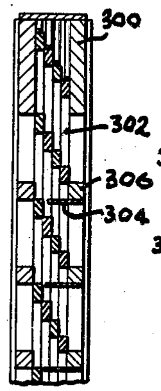
Figure 25:
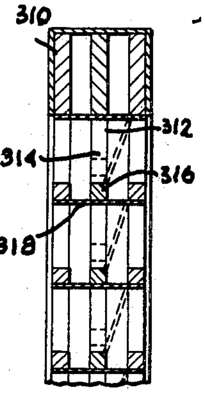
Figures 2, 3:
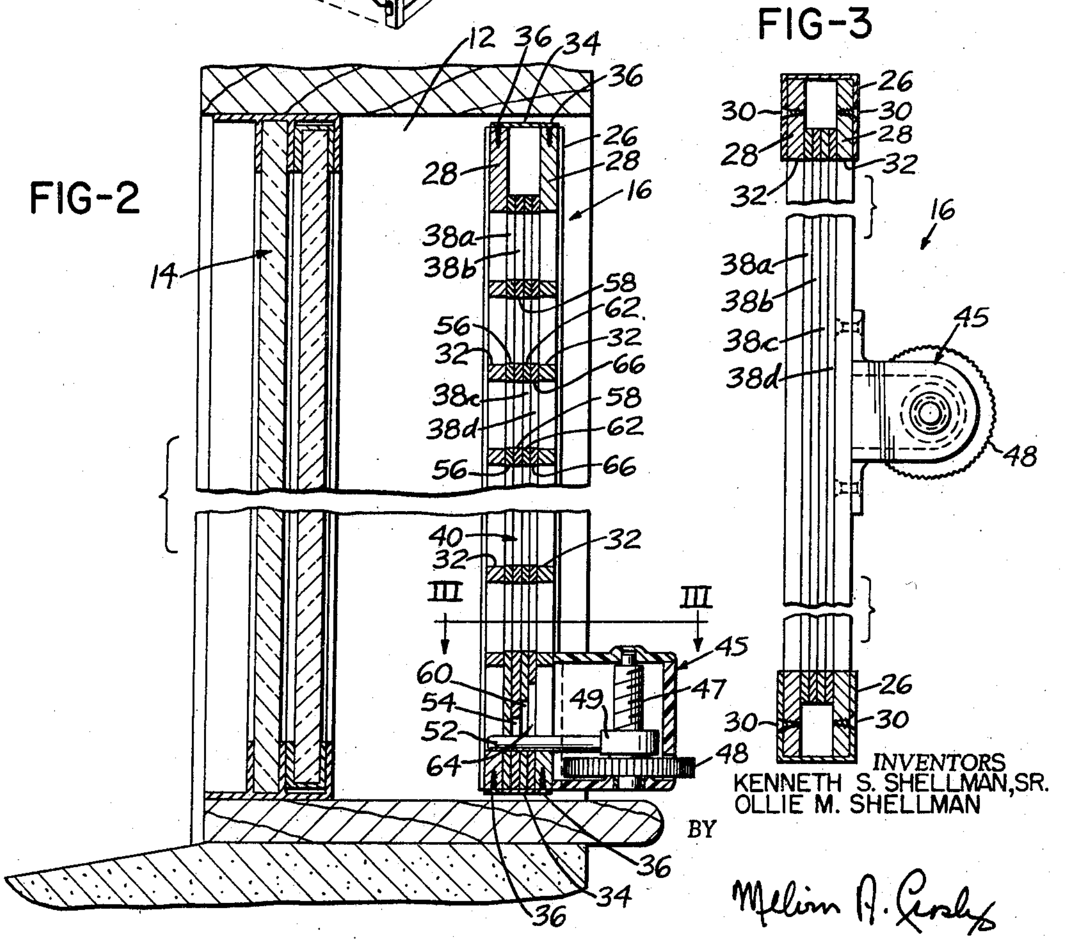
FIGURE 2 is a vertical section indicated by line II—II on FIGURE 1 and showing the shutter type blind in position in the window opening.
FIGURE 3 is a plan sectional view indicated by line III—III on FIGURE 2 and showing the blind in transverse plan cross section.

FIGURE 24 is a vertical sectional view somewhat similar to FIGURE 2, but showing a modified construction; and FIGURE 25 is a vertical sectional view showing still another modification of the present invention.

Brief summary of the invention

The present invention, in brief, refers to a blind construction in which a plurality of panels are arranged in a frame and intermediate panels moveable in the frame. The panels are provided with alternate regions which are opaque and transparent respectively, and extend across the panels at right angles to the direction of movement of the moveable panels. In one extreme position of the moveable panels the transparent areas are in registration and in another extreme position of the panels the transparent areas are in edge to edge relationship to each other. The frame carries an actuating mechanism for moving the moveable panels between their extreme positions. The alternating opaque and transparent regions can be formed by slotting opaque panels or by forming solid panels of transparent material with opaque regions imprinted thereon or embodied therein.

Figure 1:
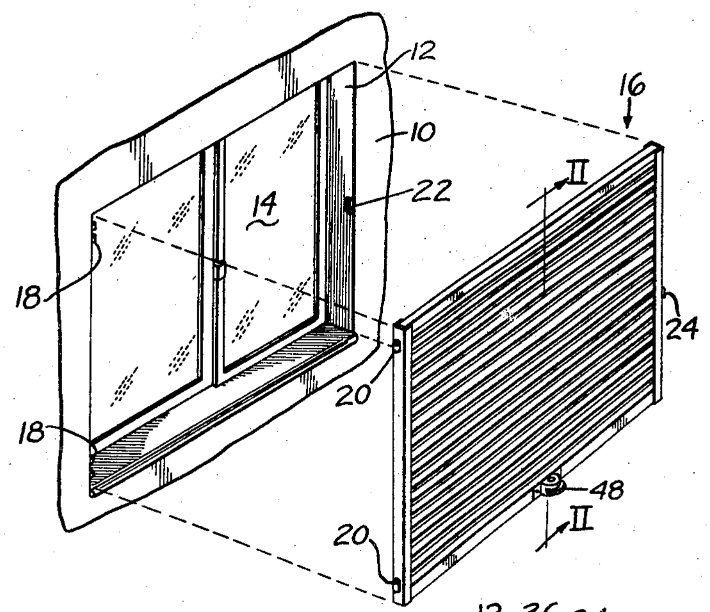
FIGURE 1 is a perspective view showing a window opening and a shutter type blind according to the present invention adapted for being hingedly mounted therein.

Referring to the drawings somewhat more in detail, in FIGURE 1 a building wall 10 has a window opening 12 therein in which is mounted window means 14 which may consist, for example, of sliding panels of a well known type.

A shutter type blind member, generally indicated at 16 is adapted for mounting in the window for the purpose of regulating the light which comes in through the window and for the purpose of closing off the window opening either to shut off the light completely or to provide privacy for the people inside the building. In FIGURE 1 the window frame has hinge elements 18 mounted therein and the blind 16 has cooperating hinge elements 20 thereon while the winder opening on the opposite side has an element 22 of a latch means which is adapted for cooperating with element 24 of latch means of the blind. It will be evident that the blind construction could readily be mounted in the window opening and, due to the hinge and latch construction could be swung open and closed, as desired. Turning now to FIGURE 2, taken together with FIGURES 3 through 6, it will be seen that the blind comprises a pair of end channel members 26 within which are mounted the main panels 28 of the blind construction. These main panels 28 are positioned immediately inside the opposite legs of channel members 26 and are secured to the said opposite legs by screws 30. The panel members 28 have slot-like openings 32 therein of substantial size. Preferably, strips 34 are mounted on the top and bottom of the blind construction extending at right angles to channels 26 and are retained in place on the main panels 28 as by screws 36 so as to complete the peripheral enclosure of the blind construction. Disposed in the space between panels 28 are a plurality of movable panels 38*a*, 38*b*, 38*c* and 38*d*, shown at exaggerated thickness in the drawings. These last mentioned panels are movable vertically in the space between panels 28 and the modification of FIGURES 1 to 6. When the movable panels are in their lowermost position, apertures 40 therein register with each other and with the apertures 32 of main panels 28. The blind is shown in its open position in FIGURES 2 and 4. Upward movement of panels 38*a* and 38*b* so as to vary the registration of the aforementioned apertures comes about in response to rotation of thumb wheel 48. Thumb wheel 48 is fastened to a screw 47 rotatably mounted in a housing 45 fixed to the frame of the blind at the bottom. A nut 49 moves along screw 47 when the thumb wheel is turned. Nut 49 carries a pin 52 extending through apertures in the panels 28, and 38*a*–38*d*.

As will be seen in FIGURE 2 taken together with FIGURE 11, the hole in panel 38*a* snugly fits pin 52 whereas the holes in each of the panels 38*b*, 38*c* and 38*d* are progressively longer in the direction of movement of pin 52. The purpose of the increasing length of the holes is to provide for the panels to gradually move from completely open to completely closed position. For example, when pin 52 is moved vertically, by the time it abuts the upper end of the hole 54 in panel 38*b*, the cross bars 56 at the top and bottom edges of the apertures 40 in panel 38*a* are just overlapping the edges of the bars 58 in panel 38*b*. Upon further movement of pin 52 in the vertical direction, panels 38*a* and 38*b* will move upwardly together and when pin 52 abuts the upper end of the hole 60 in panel 38*c*, the bars 58 of panel 38*b* will be just overlapping the edges of bars 62 of panel 38*c*. The blind in this last mentioned position is illustrated in FIGURE 5. Further movement vertically of pin 52 will cause panels 38*a* and 38*b* and 38*c* to move in unison and when pin 52 abuts the upper end of hole 64 in panel

38*d*, bars 62 of panel 38*c* will be overlapping the top edges of bars 66 of panel 38*d*. Continued movement vertically of pin 52 will then cause all of the panels 38*a* to 38*d* to move in unison to the uppermost position at which time the blind will be fully closed as shown in FIGURE 6. Movement downwardly of pin 52 will cause progressive opening of the shutter in a manner exactly reverse to what has been described above.

In order to hold the movable panels in proper alignment and to permit relatively easy movement thereof, there is preferably provided roller means 70 in the frame of the blind at opposite edges of the movable panels as shown in FIGURE 4. In FIGURE 7*a* it will be noted that these rollers might be in the form of tubes of Teflon or the like, as at 72 which are mounted on bolts or rivets 74 extending through the main panels 28.

In FIGURE 7 it will be seen that the tubes 72 could be replaced by individual rollers 76 separated by spacer elements 78 and with the rollers and spacer elements mounted on a bolt or rivet 80 extending through the main panel members 28. FIGURE 8 will show that the bolt or rivet 78 could be in the form of a shouldered member with smaller diameter portions 82 extending through the main panels 28 and riveted thereto as shown. The movable panels could have friction reducing spacers therebetween, also.

FIGURES 12 and 13 show a modification which might be used for a door or a fairly tall window, as opposed to the relatively short type window for which the first described modification is best adapted. The window or opening in which the blind of the FIGURES 12 and 13 modification is adapted to be placed is one in which the lower end of the blind is disposed too low to permit the adjusting member to be reached easily. For this reason the blind of FIGURE 12, and generally identified by reference numeral 90, is made up so as to have an upper section 92 and a lower section 94 with a transverse portion 96 therebetween and on which portion the adjusting device 98 is mounted.

As will be seen in FIGURE 13 the adjusting device 98 comprises an upper screw 100 having a pin 102 associated with movable panels generally indicated at 104 in the same manner as the adjusting device described in connection with the first modification. Adjusting device 98 however comprises a lower screw 106 having a pin 108 associated with the movable panels of the lower portion of the blind, said lower panels being generally indicated at 110. The movable panels in the lower portion of the blind are arranged as a mirror-image to those in the upper portion of the blind and this makes it convenient to operate the respective knurled wheels 112 and 114 of the screws 100 and 106, respectively, either individually or in unison. Either blind portion can thus be opened and closed individually, or both blind portions can be adjusted at the same time.

The upper blind portions, in their lowest position rest on an abutment element indicated by reference numeral 116. The movable panels of the lower section of the blind in the uppermost position in which they are illustrated in FIGURE 13 rest on the pin 108. Thus, as pin 108 moves downwardly all of the movable panels of the lower section of the blind will move downwardly simultaneously. To obtain the staggered stopping of the movable panels of the lower section so that downward movement of pin 108 will effect the desired adjustment there is an abutment member 118 at the bottom of the lower section of the blind having the steps 120 thereon which progressively abut and stop the movable panels of the lower section so that the blind will gradually close in the lower part thereof as knurled wheel 114 is adjusted. The panels could, alternately, be of different lengths.

FIGURES 15 and 16 show a blind 130 in which the movable panels are movable horizontally. This blind structure is the same as that described in respect of the first modification except the adjustment 132 is mounted about half-way up one side of the frame of the blind and, as mentioned, the panels move horizontally. The arrangement in FIGURES 15 and 16 is adapted for insertion into a window opening and is retained therein as by the bowed leaf springs 134. The blind in FIGURE 15 is particularly adapted for being placed in a window frame, such as a metal window frame having a channel region 136 into which the blind can be disposed and wherein it will be held by the bowed leaf springs 134.

Inasmuch as the panels, generally indicated at 138, of the modification of FIGURES 15 and 16 move horizontally, it cannot be depended on that the gravitational force acting thereon will produce the progressive movement thereof as has been described in respect of the previously described modifications. However, the slight frictional engagement of the panels with the frame and with an adjacent panel will, in the normal course of events, permit the movable panels 138 to move successively as the pin 140 of adjusting mechanism 132 moves in respectively opposite directions. It is within the purview of this invention to provide biasing springs for the movable panels if this proves to be desirable.

FIGURE 17 shows how movable panel members 150 could be provided with alternate transparent regions 152 and opaque regions 154 cooperating with each other and with opaque regions 156 on the stationary side panel 158 to provide for gradual closing off of the transparency of the opening as the panels are adjusted relative to each other.

FIGURE 18 shows how movable panels 160 could be provided with differently shaped openings as has heretofore been referred to, for example, diamond shaped openings 162. Other shapes of openings are also possible within the purview of the present invention.

The panels can be made of wood or fiberboard or pressed wood or plastic or glass fiber reinforced plastic or of any other suitable material. The outer frame portions, such as channels 26 and the top and bottom strips 34 are advantageously made of metal.

It is possible for the panel members to be opaque and it is also possible for them to be translucent so that a certain amount of light would pass therethrough even with the blind completely closed. The main side panels 28 could be made of metal or of a material similar to that employed for the movable panels.

It has been mentioned that the shutter type blind is especially adapted for use with window openings but it will also be apparent that it could be employed in connection with door openings if so desired and in which case the shutter type blind would preferably be pivoted in the opening as shown in connection with the modification of FIGURE 1.

It has also ben stated that the blind is especially adapted for use in combination with a window and it is shown in this combination of FIGURES 1, 2 and 16. However, when the shutter type blind according to the present invention is made as shown in FIGURE 17 with continuous panels, it could serve, itself, as the window for an opening in a wall and no other window would be required. In connection with the use of the shutter type blind according to the present invention as a closure for a wall opening in which no window is mounted, it will further be appreciated that the movable panels could be apertured as shown in the modification of FIGURE 2, for example, the outwardly facing side of the shutter type blind for excluding insects in the absence of a glass window on the outer side of the blind. Still further, for an economical unit, the shutter type blind of the present invention could be provided with a frame on its outwardly facing side for selectively receiving either a glass panel or a screen and, in this manner, the shutter type blind could be made integral with a window to place in a wall opening of a structure and would be adapted for use either in cold or warm weather by virtue of the interchangeable glass and screen.

FIGURE 19 shows a modified arrangement in which the movable panels, generally indicated at 200, are slidably mounted in a frame 202. The construction of the frame and the panels therein in FIGURE 19 is the same as the previously described modifications wherein the panels move vertically in the frame. The essential difference between FIGURE 19 and the previously described modifications resides in the actuator mechanism generally indicated at 204 in FIGURE 19. In FIGURE 20 it will be seen that the actuator mechanism 204 comprises a slidable plate 206, preferably recessed into the lower member of frame 202. Connected to member 206 is a pin 208 extending through the several movable panels of the arrangement. A snap ring 210 may be provided to retain the member 206 and its pin 208 in place and it will be observed that the snap ring is movable in a recess provided therefor in the rear side of the lower frame member of frame 202. It will also be noted that the pin 208 extends into a slot provided therefor in the frame member at the opposite side of the frame from member 206. It will be appreciated that the actuator of FIGURES 19 and 20 does not project outwardly from the frame of the shutter type blind and this permits use of the blind in instances where a projecting actuator would be objectionable.

In FIGURES 21 and 22 it will be noted that a first one of the movable panels, indicated at 212 has a slot 214 therein for receiving pin 208 and that this slot has an offset toward the left end so that as soon as pin 208 commences movement toward the right, as indicated by arrow 216, the first panel 212 will move upwardly a predetermined amount, this amount, as indicated before, being a distance equal to slightly less than the vertical spacing between the apertures therein. Further movement of pin 208 merely supports panel 212 in its shifted position.

The next panel 218 has a slot 220 therein similar to slot 214 except that the incline is disposed farther to the right so that panel 218 commences to move only when panel 212 reaches its uppermost position. Panel 218, thereafter, during continued rightward movement of pin 208 will move to its upper position and will remain in that position during the continued movement of pin 208. The other panels 222 and 224 have respective slots 226 and 228 therein which cause those panels to move upwardly in succession following upward movement of panel 218.

FIGURE 23 shows how a blind of the nature disclosed in FIGURES 19 through 22 can be mounted in a casement type window. In the window illustrated, frame part 230 is stationary in the wall opening 232 and, at one side of the opening, has stationarily mounted therein a glass window 234. This window can be removable if so desired and means are provided for mounting a screen 236 in the window opening.

The frame also includes a movable frame part 238 having mounted therein a glass 240. The stationary frame also has means for receiving a screen 242 in the side thereof which glass 240 closes when it is in the position in which it is above in FIGURE 23. The stationary frame also has two channel portions 244 and 246 in which are mounted blind structures 248 and 250 constructed according to the present invention. The blind structures have actuators, one of which is shown at 252 in connection with blind 248 and which actuators are of the type disclosed in FIGURES 19 to 22. This actuator permits the blind to be inserted without the actuator forming an obstruction to the movement of the window glasses.

It will be apparent that for winter use the screens 236 and 242 can be removed and during this period it is advisable for the blind structure 248 to be inserted into the inside groove 254 provided therefor in the movable frame 238. In this manner the blind structure will be protected from inclement weather. In summer use, the blind structures can be placed in the positions in which they are shown in FIGURE 23 and the screens can be put in place and glass 234 can be removed, if desired, and, also, glass 240 can be removed or glass 240 together with frame 238 can be removed thereby giving a wide open window area for ventilation.

In FIGURE 24, reference numeral 300 indicates the frame of the shutter-type blinder and numeral 302 represents the movable panels therein. In order to provide for more complete cutting off of light and to prevent visibility through the blind when it is in closed position, there are short strips 304 secured to the underside of the cross bars 306 of the one outer frame member and which project inwardly almost to the rearmost one of the movable panel. When the panels are moved to their light excluding position, as shown in FIGURE 24, strips 304 substantially complete the closure and exclude light from the interior of the building and also prevent ready visibility in the downward diagonal direction. Strips 304, however, do not in any way interfere with the movement of the movable panels.

In FIGURE 25, a modification is illustrated in which the frame of the device is indicated by reference numeral 310. In this modification, a single movable panel 312 may be employed and this panel has apertures 314 and cross bars 316 forming the boundaries of the apertures. The flexible strips 318 are secured to the undersides of the upper walls of the apertures in one side panel of the outer frame. When the movable panel 312 is moved downwardly, the strips 318 are also tilted downwardly, as shown by the dot-dash outlines thereof, so as completely to close the openings through the blind, thereby to provide for complete closure thereof. These strips may be metal or plastic and can be movably mounted at one end in any desired manner so as to be biased toward their upper position and do not interfere with the clear opening when the blind is open, but provide for complete closure thereof when the blind is moved to closed position.

What is claimed is:

1. A device adapted for mounting in a wall opening and comprising: a frame, a plurality of panels in superimposed face to face relation mounted in said frame and having alternating opaque and transparent regions, said panels having a first relative position wherein said transparent regions are in full registration and a second relative position wherein said transparent regions are out of full registration, said panels including a pair of spaced parallel outer panels stationary in said frame and moveable panels in the space between said outer panels and moveable in said frame, all of said opaque regions of said moveable panels and representing the space between adjacent ones of said transparent regions being of the same first length measured in the direction of movement of the moveable panels and all of said transparent regions of said moveable panels being of the same second length measured in the same said direction, adjusting means carried by the frame and operatively connected to said moveable panels and operable for moving the said moveable panels in a predetermined direction relative to each other and relative to said outer panels, said opaque and transparent regions being in the form of parallel regions extending at right angles to the direction of movement of said moveable panels and the said second length of each transparent region being about equal to the said first length multiplied by the number of moveable panels, said adjusting means comprising a pin adjustable on said frame in said predetermined direction and extending through at least all of said moveable panels, each said moveable panel having a hole receiving the pin, the hole in the moveable panel on one side being the same diameter as the pin and the holes in successive ones of said moveable panels being progressively longer in the direction of movement of the movable panels.

2. A shutter type blind according to claim 1, in which said holes in the successive ones of said moveable panels commencing with the moveable panel adjacent the said outer panel on one side is longer than the hole in the preceding moveable panel an amount about equal to the length of the space between adjacent ones of said transparent regions.

3. A shutter type blind according to claim 2, in which said moveable panels reciprocate in said frame in a direction extending between two opposite edges of the panels and said frame includes guide means engaging the other two opposite edges of the moveable panels.

4. A shutter type blind according to claim 3, in which said panels are made of transparent material and said transparent regions are defined by spaced opaque areas formed on said panels.

5. A shutter type blind according to claim 3, in which said panels are made of opaque material and said transparent regions are in the form of slots in the said panels.

6. A blind having a frame according to claim 3, in which said opaque regions are disposed in substantially exact registration in one extreme position of said moveable panels while in the other extreme position of said moveable panels the said opaque regions are substantially in edge to edge relation out of registration.

7. A shutter type blind according to claim 5, in which strips lying in planes perpendicular to the direction of movement of said panels are connected along one edge only thereof to a side wall of at least some of said slots in one of said outer panels and extends toward the other said outer panel through the adjacent slots of at least some of said moveable panels and serve for interrupting the line of sight diagonally through the shutter blind when the said moveable panels are moved to the position wherein said slots are out of registration to the maximum degree.

8. A shutter type blind according to claim 7, in which said strips are thin and flexible and extend from the said one outer panel through the corresponding slots in the moveable panels and into the corresponding slot in the other said outer panel, said strips being secured to the sides of the slots in said one outer panel which face in the direction in which the moveable panels move when the slots therein are diminishing in registration whereby said strips will bend so as to cover the said slots and prevent light from passing therethrough.

References Cited

UNITED STATES PATENTS

| | | | | |
|---|---|---|---|---|
| 882,778 | 3/1908 | Burckhardt | 98—101 | X |
| 1,462,343 | 7/1923 | Jenkins | 98—96 | X |
| 1,568,545 | 1/1926 | Colgan | 49—35 | |
| 2,308,262 | 1/1943 | Beil | 49—38 | |
| 2,322,590 | 6/1943 | Pickering et al. | 49—38 | X |
| 2,322,733 | 6/1943 | Steiner | 49—38 | X |
| 2,549,167 | 4/1951 | Brubaker | 49—38 | X |
| 2,635,523 | 4/1953 | Hunter | 49—38 | X |
| 2,807,992 | 10/1957 | Ehman | 98—101 | X |
| 2,976,795 | 3/1961 | Brugler | 49—38 | X |

DENNIS L. TAYLOR, Primary Examiner

U.S. Cl. X.R.

98—41